US009838964B2

(12) United States Patent
Singhai et al.

(10) Patent No.: US 9,838,964 B2
(45) Date of Patent: Dec. 5, 2017

(54) APPLICATION DRIVEN FAST DORMANCY

(71) Applicant: Qualcomm Incorporated, San Diego, CA (US)

(72) Inventors: Sandeep Singhai, San Diego, CA (US); Anurag Singh, San Diego, CA (US); Naveen Kalla, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 120 days.

(21) Appl. No.: 13/739,622

(22) Filed: Jan. 11, 2013

(65) Prior Publication Data
US 2014/0199979 A1    Jul. 17, 2014

(51) Int. Cl.
*H04Q 7/10* (2006.01)
*H04W 52/02* (2009.01)

(52) U.S. Cl.
CPC ... *H04W 52/0216* (2013.01); *H04W 52/0212* (2013.01); *Y02B 60/50* (2013.01)

(58) Field of Classification Search
CPC ........... H04W 52/0251; H04W 76/046; H04W 76/048; H04W 76/068
USPC .......................... 455/574, 418; 370/252, 241
See application file for complete search history.

(56) References Cited

U.S. PATENT DOCUMENTS

| 7,680,478 | B2 * | 3/2010 | Willars et al. ............. 455/343.2 |
| 7,826,818 | B2 * | 11/2010 | Gollnick et al. ............. 455/343.4 |
| 7,949,377 | B2 * | 5/2011 | Islam et al. .................. 455/574 |
| 8,527,662 | B2 * | 9/2013 | Biswas et al. ................ 709/249 |
| 8,654,691 | B2 * | 2/2014 | Anderson et al. ............ 370/310 |
| 2008/0285575 | A1 | 11/2008 | Biswas et al. |
| 2011/0131321 | A1 | 6/2011 | Black et al. |
| 2011/0138238 | A1 | 6/2011 | Whetsel |
| 2012/0281561 | A1 * | 11/2012 | Shukla ................ H04W 76/068 370/252 |

FOREIGN PATENT DOCUMENTS

WO    2011138238 A1    11/2011

OTHER PUBLICATIONS

International Search Report and Written Opinion—PCT/US2013/078348—ISA/EPO—May 2, 2014.
Taiwan Search Report—TW103100687—TIPO—Jun. 5, 2015.

* cited by examiner

*Primary Examiner* — Ajit Patel
*Assistant Examiner* — Julio Perez
(74) *Attorney, Agent, or Firm* — Larry J. Moskowitz

(57) ABSTRACT

Aspects of the present disclosure are directed to a user equipment, an RNC, or an application operable in a wireless communications network and methods in which the user equipment can be transitioned into a dormant state controlled by an application driven scheme. According to the application driven scheme, a request is received from an active process at an application server to trigger a wireless device to enter a dormant state, and network traffic information corresponding to a time interval is received from a wireless device. If the network traffic information indicates that the active process is solely responsible for network traffic at a transport layer of the wireless device during the time interval, one or more commands are transmitted to the wireless device such that the wireless device enters the dormant state. Other aspects, embodiments, and features are also claimed and described.

34 Claims, 8 Drawing Sheets

Port Activity Statistics (PAS) Table

| Port # | Timestamp |
|---|---|
| Port # | Timestamp |
| Port # | Timestamp |
| Port # | Timestamp |
| Port # | Timestamp |
| . | . |
| . | . |
| . | . |
| | |
| | |
| | |
| | |
| | |
| | |

601

APPLICATION DRIVEN FAST DORMANCY

TECHNICAL FIELD

The technology discussed in this patent application relates generally to wireless communication systems, and more particularly, to mitigating power consumption of user equipment in a wireless communications network.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN).

As the demand for mobile broadband access continues to increase, research and development continue to advance the UMTS technologies not only to meet the growing demand for mobile broadband access, but to advance and enhance the user experience with mobile communications. One important aspect of the user experience is the operating time of a battery-powered mobile device. With the increasing data usage of the mobile device, the operating time of the mobile device is significantly affected by how effective the mobile device can handle its power usage.

BRIEF SUMMARY OF SOME SAMPLE EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the present disclosure are directed to a user equipment operable in a wireless communications network and methods in which the user equipment can be transitioned into a dormant state controlled by an application driven scheme.

In one aspect, the disclosure provides a method of operating a controller (e.g., a radio network controller or RNC) in a wireless communications network. The method includes receiving a request from an active process at an application server to trigger a wireless device to enter a dormant state; receiving network traffic information corresponding to a time interval from the wireless device; and if the network traffic information indicates that the active process is solely responsible for network traffic at a transport layer of the wireless device during the time interval, transmitting one or more commands to the wireless device such that the wireless device enters the dormant state.

Another aspect of the disclosure provides a method of operating a wireless device in a communications network. The method includes storing network traffic information at the wireless device for a time interval; transmitting the network traffic information from the wireless device to a controller of the communications network in response to receiving a request from the controller; and entering a dormant state in response to receiving one or more commands from the controller.

Another aspect of the disclosure provides a controller operable in a wireless communications network. The controller includes means for receiving a request from an active process at an application server to trigger a wireless device to enter a dormant state; means for receiving network traffic information corresponding to a time interval from the wireless device; and if the network traffic information indicates that the active process is solely responsible for network traffic at a transport layer of the wireless device during the time interval, means for transmitting one or more commands to the wireless device such that the wireless device enters the dormant state.

Another aspect of the disclosure provides a wireless device operable in a communications network. The wireless device includes means for storing network traffic information at the wireless device for a time interval; means for transmitting the network traffic information from the wireless device to a controller of the communications network in response to receiving a request from the controller; and means for entering a dormant state in response to receiving one or more commands from the controller.

Another aspect of the disclosure provides a controller operable in a wireless communications network. The controller includes at least one processor; and a memory coupled to the at least one processor, wherein the at least one processor is configured to: receive a request from an active process at an application server to trigger a wireless device to enter a dormant state; receive network traffic information corresponding to a time interval from the wireless device; and if the network traffic information indicates that the active process is solely responsible for network traffic at a transport layer of the wireless device during the time interval, transmit one or more commands to the wireless device such that the wireless device enters the dormant state.

Another aspect of the disclosure provides a wireless device operable in a communications network. The wireless device includes at least one processor; and a memory coupled to the at least one processor, wherein the at least one processor is configured to: store network traffic information at the wireless device for a time interval; transmit the network traffic information from the wireless device to a controller of the communications network in response to receiving a request from the controller; and enter a dormant state in response to receiving one or more commands from the controller.

Another aspect of the disclosure provides a computer program product. The computer program product includes a computer-readable storage medium including code for causing a wireless device operable in a communications network to: store network traffic information at the wireless device for a time interval; transmit the network traffic information from the wireless device to a controller of the communications network in response to receiving a request from the controller; and enter a dormant state in response to receiving one or more commands from the controller.

Another aspect of the disclosure provides computer program product. The computer program product includes a computer-readable storage medium including code for causing a controller of a wireless communications network to: receive a request from an active process at an application server to trigger a wireless device to enter a dormant state; receive network traffic information corresponding to a time interval from the wireless device; and if the network traffic information indicates that the active process is solely responsible for network traffic at a transport layer of the wireless device during the time interval, transmit one or more commands to the wireless device such that the wireless device enters the dormant state.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods

DETAILED DESCRIPTION

Figure 1:
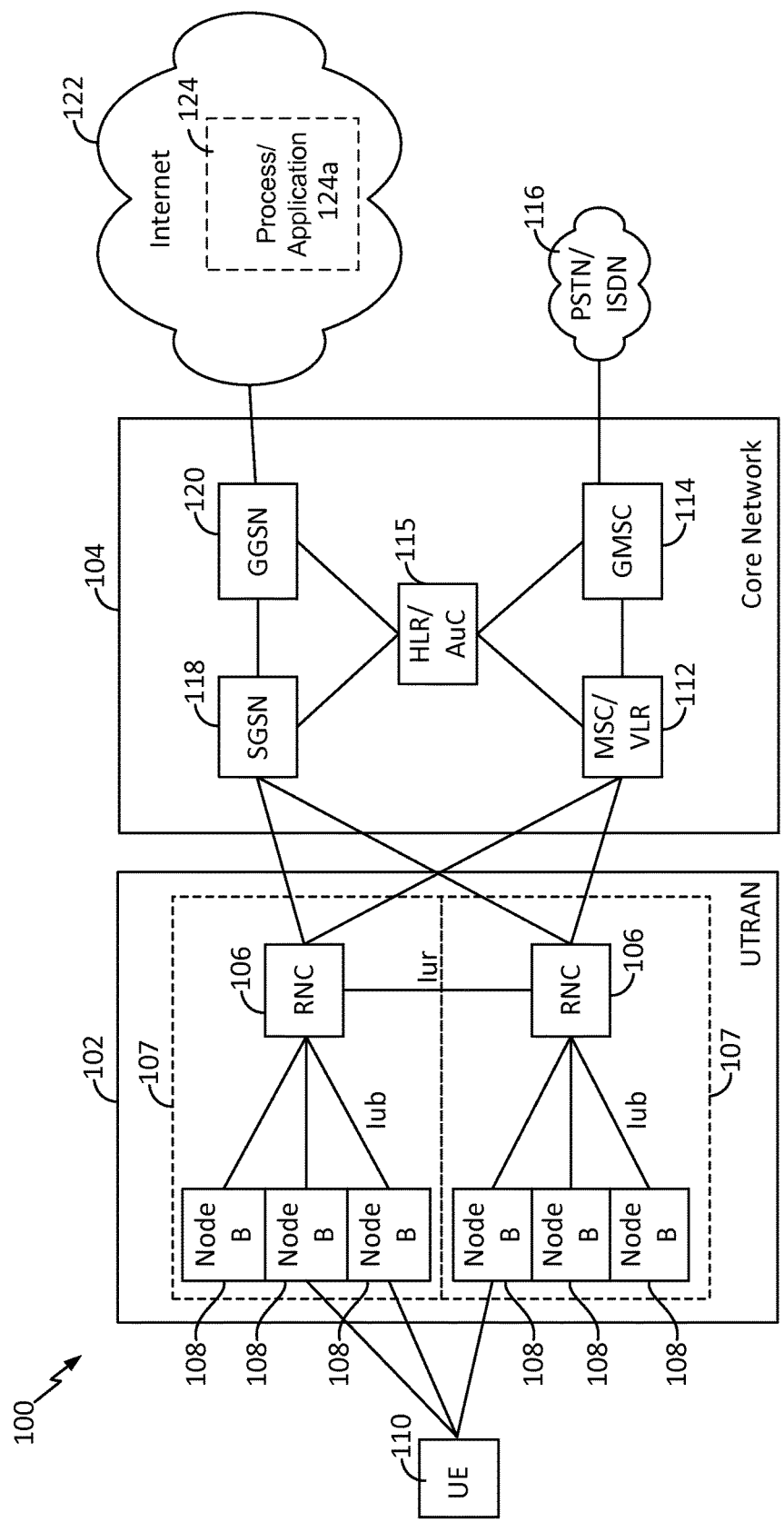
FIG. 1 is a block diagram conceptually illustrating an example of a Universal Mobile Telecommunications System (UMTS) according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the present disclosure are directed to a wireless communications network (e.g., a Universal Mobile Telecommunications System (UTMS)) and methods in which a network entity (e.g., a user equipment, a wireless device, an access terminal, etc.) operable in the network can be transitioned into a low power state or a dormant state in response to an indication that an active process (e.g., an application running at an application server) is finished making use of the network entity to transfer packet data. The active process (e.g., an email server) has knowledge that it is unlikely to have further data traffic with a user equipment (UE) for a time period. Therefore, the active process can send the indication to a suitable control entity (e.g., RNC) in the network such that the control entity is aware of the situation and may take suitable actions to trigger the UE to enter a dormant state to reduce the UE's power consumption.

It is beneficial to quickly enter a dormant state upon completion of current data traffic to conserve the battery power of the UE when no further data transfer is anticipated. In this disclosure, the dormant state generally refers to a condition in which the UE enters a lower power consuming state and may release one or more of its signaling channels. However, if the UE goes dormant prematurely, it will undesirably increase the air signaling overhead to bring up the data call again. In the related art, this trade-off may be addressed by having a network wide inactivity timer for a duration $t_a$, and dormancy (i.e., entering the dormant state) is triggered when there is no data traffic for the duration $t_a$ and the timer is reset whenever there is any data traffic.

Sometimes, however, the network-wide timer approach is sub-optimal for cases where a specific application triggered and consumed the data traffic, and the application has knowledge that no further data traffic is expected or likely for some predetermined interval. In such a scenario, the data call will not go dormant for the $t_a$ duration even though there is no data traffic expected during the above duration. Therefore, as illustrated in the examples of the present disclosure below, applications that follow periodic synchronization schedules will benefit from an application driven approach to trigger the UE to enter dormancy. For example, once an email application has downloaded all the emails to the UE, the UE can be put into dormancy right away if there is no other user of the data call, and the next email download is scheduled to happen only after a certain time interval. Other aspects and examples of the present disclosure will be described below in more detail.

The various concepts presented throughout this disclosure may be implemented across a broad variety of telecommunication systems, network architectures, and communication standards. FIG. 1 is a block diagram conceptually illustrating an example of a wireless communications system 100 such as a Universal Mobile Telecommunications System (UMTS) network. But embodiments of the present invention can be utilized in other types of communication networks.

Referring now to FIG. 1, as an illustrative example without limitation, various aspects of the present disclosure are illustrated with reference to the UMTS network 100. The UMTS network 100 includes three interacting domains: a core network 104, a radio access network (RAN) 102 (e.g., a UMTS Terrestrial Radio Access Network (UTRAN)), and a user equipment (UE) 110. Among several options available for a UTRAN 102, in this example, the illustrated UTRAN 102 may employ a W-CDMA air interface for enabling various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106.

Here, the UTRAN 102 may include any number of RNCs 106 and RNSs 107 in addition to the illustrated RNCs 106 and RNSs 107. The RNC 106 is an apparatus responsible for, among other things, assigning, reconfiguring, and releasing radio resources within the RNS 107. The RNC 106 may be interconnected to other RNCs (not shown) in the UTRAN 102 through various types of interfaces such as a direct physical connection, a virtual network, or the like using any suitable transport network.

The geographic region covered by the RNS 107 may be divided into a number of cells, with a radio transceiver apparatus serving each cell. A radio transceiver apparatus is commonly referred to as a Node B 108 in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, only three Node Bs 108 are shown in each RNS 107; however, the RNSs 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

In the UMTS network 100, the UE 110 may further include a universal subscriber identity module (USIM), which contains a user's subscription information to a network. For illustrative purposes, one UE 110 is shown in communication with a number of the Node Bs 108. The downlink (DL), also called the forward link, refers to the communication link from a Node B 108 to a UE 110, and the uplink (UL), also called the reverse link, refers to the communication link from a UE 110 to a Node B 108.

The core network 104 can interface with one or more access networks, such as the UTRAN 102. As shown, the core network 104 is a UMTS core network. However, as those skilled in the art will recognize, the various concepts presented throughout this disclosure may be implemented in a RAN, or other suitable access networks, to provide UEs with access to types of core networks other than UMTS networks.

The illustrated UMTS core network 104 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR, and AuC, may be shared by both of the circuit-switched and packet-switched domains.

In the illustrated example, the core network 104 supports circuit-switched services with an MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a visitor location register (VLR) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The illustrated core network 104 also supports packet-switched data services with a serving GPRS support node (SGSN) 118 and a gateway GPRS support node (GGSN) 120. General Packet Radio Service (GPRS) is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network.

An active process 124a (hereafter "Application") running on an application server 124 in the network 122 may be in data communication with the UE 110 via the UTRAN 102 and the core network 104. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain. In some examples, the application server 124 may be an email server, an instant messaging server, a database server, or any other suitable server or computer running one or more active processes such as the Application 124a, which may be configured to synchronize (e.g., transfer data) with the UE 110 periodically. The Application 124a will be described below in greater detail.

Figure 2:
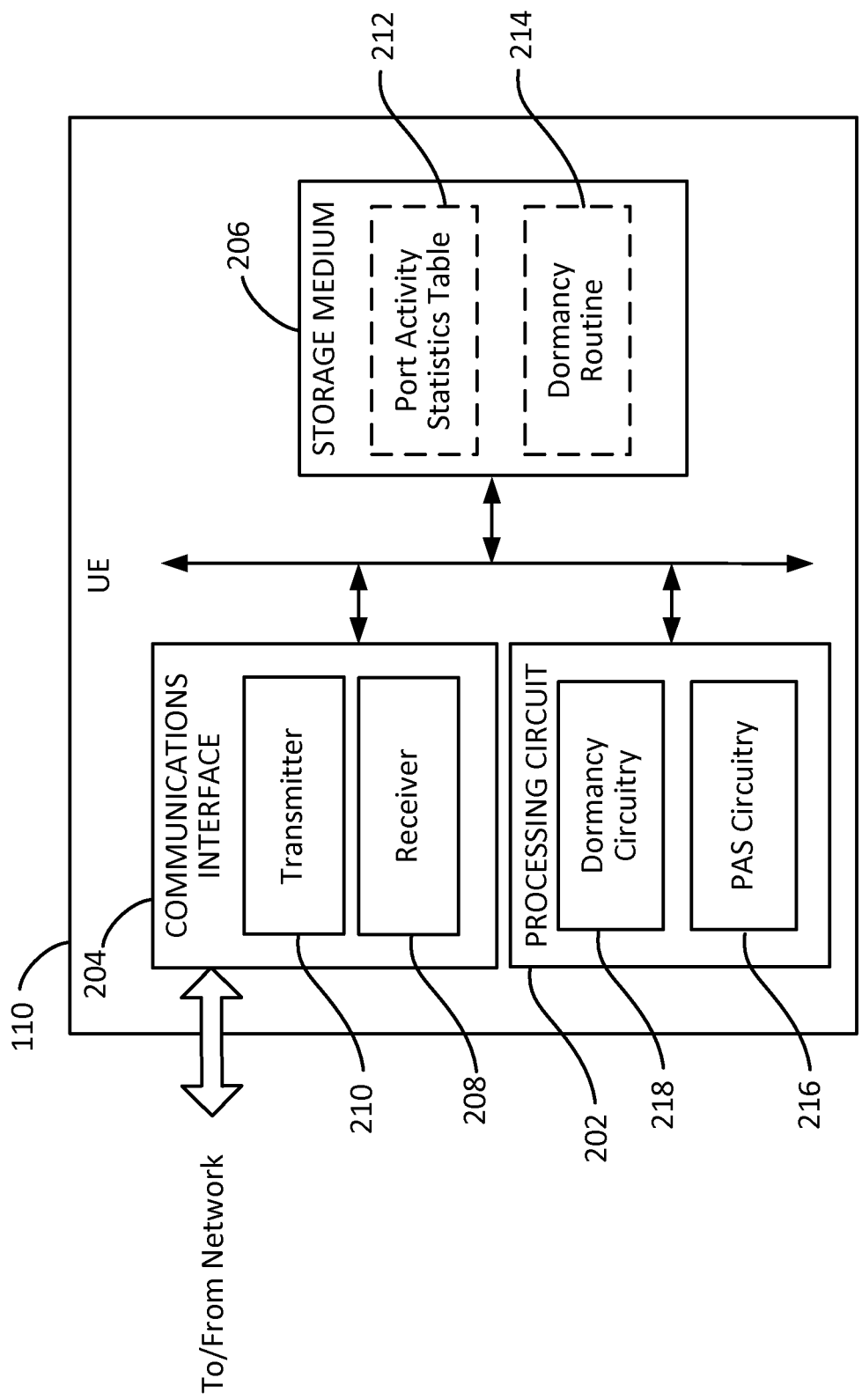
FIG. 2 is a block diagram conceptually illustrating a user equipment (UE) according to some embodiments.

FIG. 2 is a block diagram illustrating select components of the UE 110 according to at least one example. Components of the UE 110 generally known in the art are not shown for reasons of clarity and comprehensibility. As shown FIG. 2, the UE 110 generally includes a processing circuit 202 coupled to or placed in electrical communication with a communications interface 204 and a storage medium 206.

The processing circuit 202 is arranged to obtain, process and/or send data, control data access and storage, issue commands, and control other desired operations. The processing circuit 202 may include circuitry adapted to implement desired programming provided by appropriate media in at least one example. For example, the processing circuit 202 may be implemented as one or more processors, one or more controllers, and/or other structure configured to execute executable programming. Examples of the processing circuit 202 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 202 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 202 are for illustration and other suitable configurations within the scope of the present disclosure are also contemplated.

The processing circuit 202 is adapted for processing, including the execution of programming, which may be stored on the storage medium 206. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The communications interface 204 is configured to facilitate wireless communications of the UE 110. For example, the communications interface 204 may include circuitry and/or programming adapted to facilitate the communication of information bi-directionally with respect to one or more network nodes. The communications interface 204 may be coupled to one or more antennas (not shown), and includes wireless transceiver circuitry, including at least one receiver circuit 208 (e.g., one or more receiver chains) and/or at least one transmitter circuit 210 (e.g., one or more transmitter chains).

The storage medium 206 may represent one or more computer-readable, machine-readable, and/or processor-readable devices for storing programming, such as processor executable code or instructions (e.g., software, firmware), electronic data, databases, or other digital information. The storage medium 206 may also be used for storing data that is manipulated by the processing circuit 202 when executing programming. The storage medium 206 may be any available media that can be accessed by a general purpose or special purpose processor, including portable or fixed storage devices, optical storage devices, and various other mediums capable of storing, containing and/or carrying programming By way of example and not limitation, the storage medium 206 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 206 may be coupled to the processing circuit 202 such that the processing circuit 202 can read information from, and write information to, the storage medium 206. That is, the storage medium 206 can be coupled to the processing circuit 202 so that the storage medium 206 is at least accessible by the processing circuit 202, including examples where the storage medium 206 is integral to the processing circuit 202 and/or examples where the storage medium 206 is separate from the processing circuit 202 (e.g., resident in the UE 110, external to the UE 110, and/or distributed across multiple entities).

Programming stored by the storage medium 206, when executed by the processing circuit 202, causes the processing circuit 202 to perform one or more of the various functions and/or process steps described herein. For example, the storage medium 206 may include a port activity statistics (PAS) table 212, and the processing circuit 202 may include a PAS generation circuitry 216 to generate, update, and/or maintain the PAS table 212. The UE 110 may utilize the PAS table 212 to keep track of all the TCP/UDP ports that have any packet input/input (I/O) within a period of time. The PAS table 212 will be described in more detail infra. The storage medium 206 may also include a dormancy handling routine 214. The processing circuit 202 may include a dormancy circuitry 218 that perform various dormancy functions in accordance with the dormancy handling routine 214. The dormancy functions will be described in more detail infra.

Thus, according to one or more aspects of the present disclosure, the processing circuit 202 is adapted to perform (in conjunction with the storage medium 206) any or all of the processes, functions, steps and/or routines for any or all of the UEs described herein (e.g., UE 110). As used herein, the term "adapted" in relation to the processing circuit 202 may refer to the processing circuit 202 being one or more of configured, employed, implemented, and/or programmed to perform a particular process, function, step and/or routine according to various features described herein.

Figure 3:
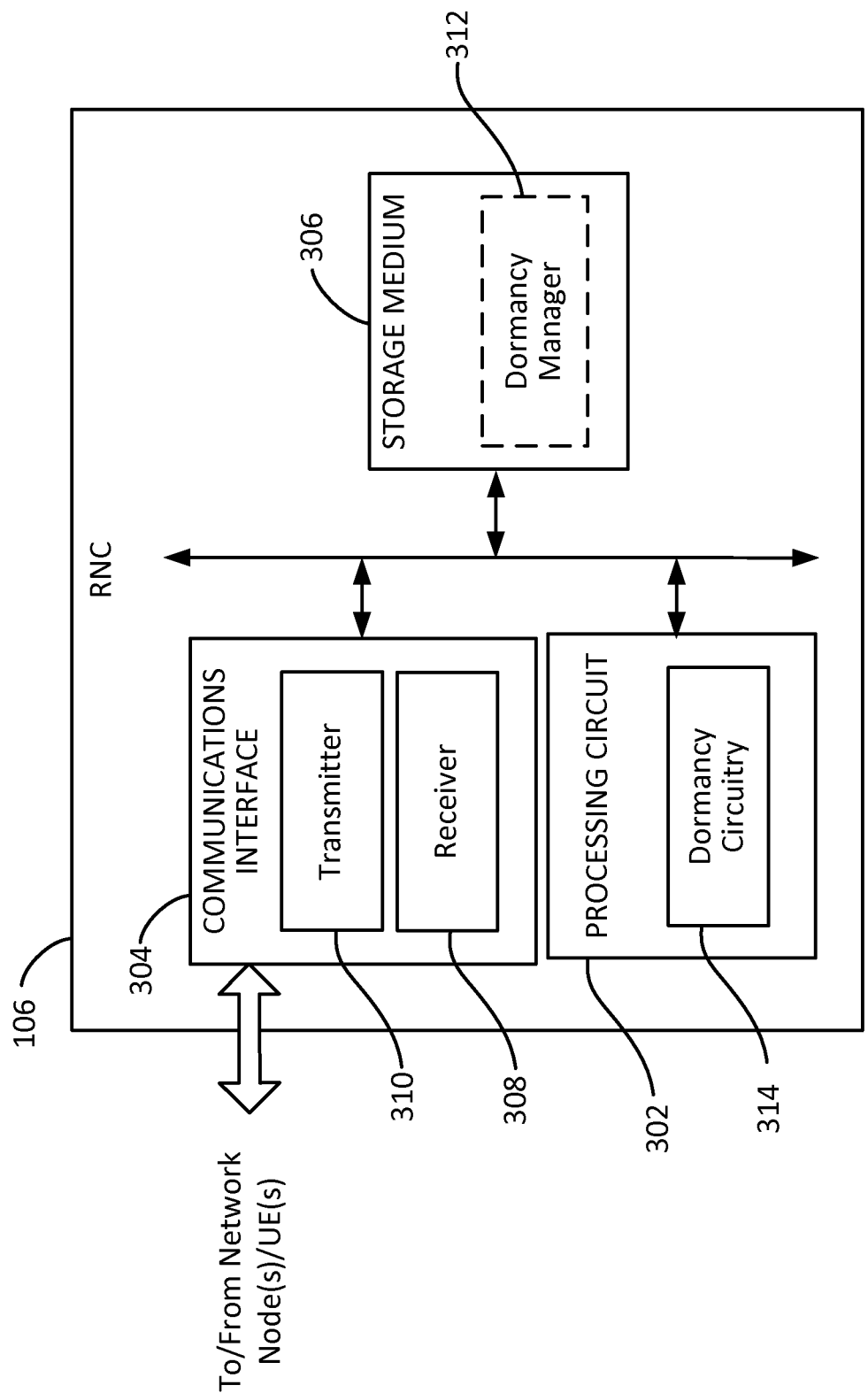
FIG. 3 is a block diagram conceptually illustrating a radio network controller (RNC) according to some embodiments.

FIG. 3 is a block diagram illustrating select components of the RNC 106 according to at least one implementation. Components of the RNC 106 generally known in the art are not shown for reasons of clarity and comprehensibility. As shown, the RNC 106 includes a processing circuit 302 coupled to or placed in electrical communication with a communications interface 304 and to a storage medium 306. The processing circuit 302 is arranged to obtain, process and/or send data, control data access and storage, issue commands, and control other desired operations. The processing circuit 302 may include circuitry adapted for processing, including the execution and implementation of programming provided by appropriate media, including media stored on the storage medium 306 in at least one example. Examples and implementations for the processing circuit 302 may include any of the various examples and implementations of the processing circuit 202 described above with reference to FIG. 2. The examples of the processing circuit 302 including those set forth with reference to the processing circuit 202 in FIG. 2 are for illustration, and other suitable configurations within the scope of the present disclosure are also contemplated.

The communications interface 304 is configured to facilitate wired and/or wireless communications of the RNC 106. For example, the communications interface 304 may include circuitry and/or programming adapted to facilitate the communication of information bi-directionally with respect to one or more UEs, as well as one or more other network nodes. The communications interface 304 may be coupled to one or more antennas (not shown), and includes wireless transceiver circuitry, including at least one receiver circuit 308 (e.g., one or more receiver chains) and/or at least one transmitter circuit 310 (e.g., one or more transmitter chains).

The storage medium 306 may represent one or more computer-readable, machine-readable, and/or processor-readable devices for storing programming, such as processor executable code or instructions (e.g., software, firmware), electronic data, databases, or other digital information. The storage medium 306 may also be used for storing data that is manipulated by the processing circuit 302 when executing programming. The storage medium 306 may be any available media that can be accessed by a general purpose or special purpose processor, including portable or fixed storage devices, optical storage devices, and various other mediums capable of storing, containing and/or carrying programming Examples of the storage medium 306 may include any of the examples included in the description of the storage medium 206 set forth above with reference to FIG. 2.

The storage medium 306 may be coupled to the processing circuit 302 such that the processing circuit 302 can read information from, and write information to, the storage medium 306. That is, the storage medium 306 can be coupled to the processing circuit 302 so that the storage medium 306 is at least accessible by the processing circuit 302, including examples where the storage medium 306 is integral to the processing circuit 302 and/or examples where the storage medium 306 is separate from the processing circuit 302 (e.g., resident in the RNC 106, external to the RNC 106, and/or distributed across multiple entities).

Programming stored by the storage medium 306, when executed by the processing circuit 302, causes the processing circuit 302 to perform one or more of the various functions and/or process steps described herein. For example, the storage medium 306 may include a dormancy manager 312, and the processing circuit 102 may include a dormancy circuitry 314 that is adapted to perform various functions in accordance with the dormancy manager 312. The various functions of the dormancy manager 312 will be described in more detail infra. Thus, according to one or more aspects of the present disclosure, the processing circuit 302 is adapted to perform (in conjunction with the storage medium 306) any or all of the processes, functions, steps and/or routines for any or all of the RNC 106 described herein. As used herein, the term "adapted" in relation to the processing circuit 302 may refer to the processing circuit 302 being one or more of configured, employed, implemented, and/or programmed to perform a particular process, function, step and/or routine according to various features described herein.

In a wireless telecommunication network, the communication protocol architecture may take on various forms depending on the particular application. For example, in a 3GPP UMTS network, the signaling protocol stack is divided into a Non-Access Stratum (NAS) and an Access Stratum (AS). The NAS provides the upper layers, for signaling between the UE 110 and the core network 104 (referring to FIG. 1), and may include circuit switched and packet switched protocols. The AS provides the lower layers, for signaling between the UTRAN 102 and the UE 110, and may include a user plane and a control plane. Here, the user plane or data plane carries user traffic, while the control plane carries control information (i.e., signaling).

Figure 4:
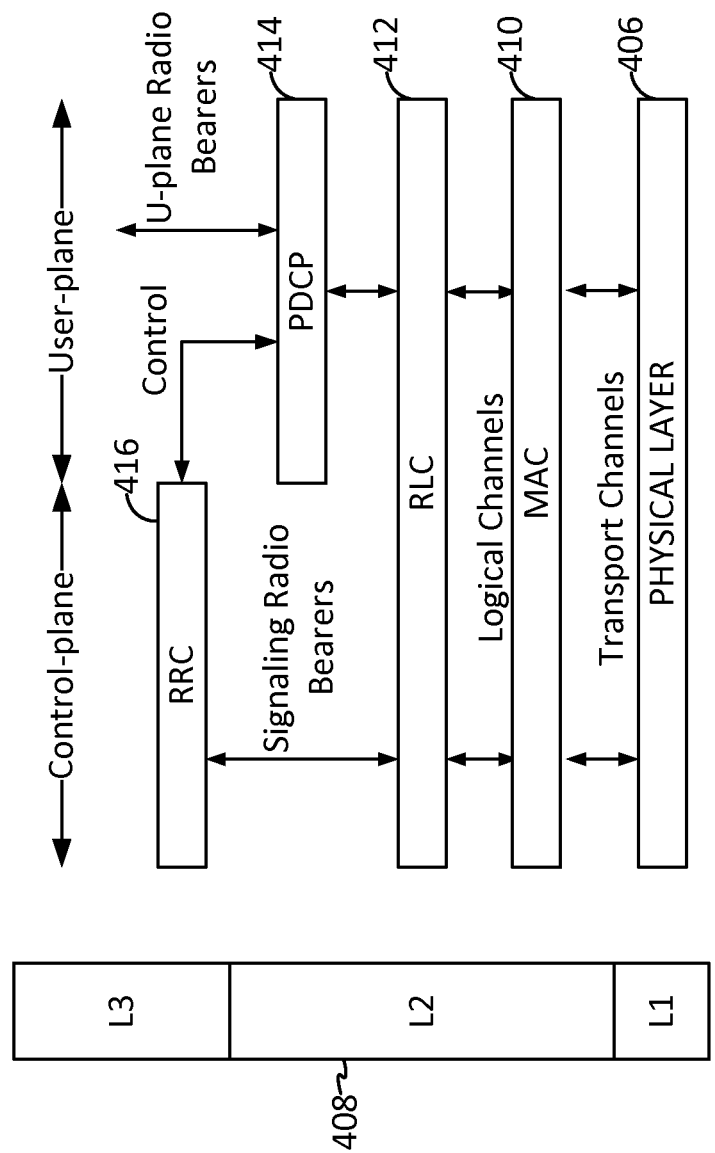
FIG. 4 is a diagram conceptually illustrating an example of a radio protocol architecture for the user and control plane to some embodiments.

FIG. 4 is a conceptual diagram illustrating an example of a radio protocol architecture for the user and control plane. Turning to FIG. 4, the AS is shown with three layers: Layer 1, Layer 2, and Layer 3. Layer 1 is the lowest layer and implements various physical layer signal processing functions. Layer 1 will be referred to herein as the physical layer 406. The data link layer, called Layer 2 408, is above the physical layer 406 and is responsible for the link between the UE 110 and Node B 108 over the physical layer 406. At Layer 3, a Radio Resource Control (RRC) layer 416 handles the control plane signaling between the UE 110 and the Node B 108. The RRC layer 416 includes a number of functional entities for routing higher layer messages, handling broadcasting and paging functions, establishing and configuring radio bearers, etc.

In the illustrated air interface, the L2 layer 408 is split into sublayers. In the control plane, the L2 layer 408 includes two sublayers: a medium access control (MAC) sublayer 410 and a radio link control (RLC) sublayer 412. In the user plane, the L2 layer 408 additionally includes a packet data convergence protocol (PDCP) sublayer 414. Although not shown, the UE 110 may have several upper layers above the L2 layer 408 including a network layer (e.g., IP layer) that is terminated at a PDN gateway on the network side and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between Node Bs.

The RLC sublayer 412 generally supports an acknowledged mode (AM) (where an acknowledgment and retransmission process may be used for error correction), an unacknowledged mode (UM), and a transparent mode for data transfers, and provides segmentation and reassembly of upper layer data packets and reordering of data packets to compensate for out-of-order reception due to a hybrid automatic repeat request (HARQ) at the MAC layer. In the acknowledged mode, RLC peer entities such as an RNC and a UE may exchange various RLC protocol data units (PDUs) including RLC Data PDUs, RLC Status PDUs, and RLC Reset PDUs, among others. In the present disclosure, the term "packet" may refer to any RLC PDU exchanged between RLC peer entities.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations.

According to various aspects of this disclosure, power mitigation of a UE 110 can be driven from the Application 124a that has been in data communication with the UE 110.

Figure 5:
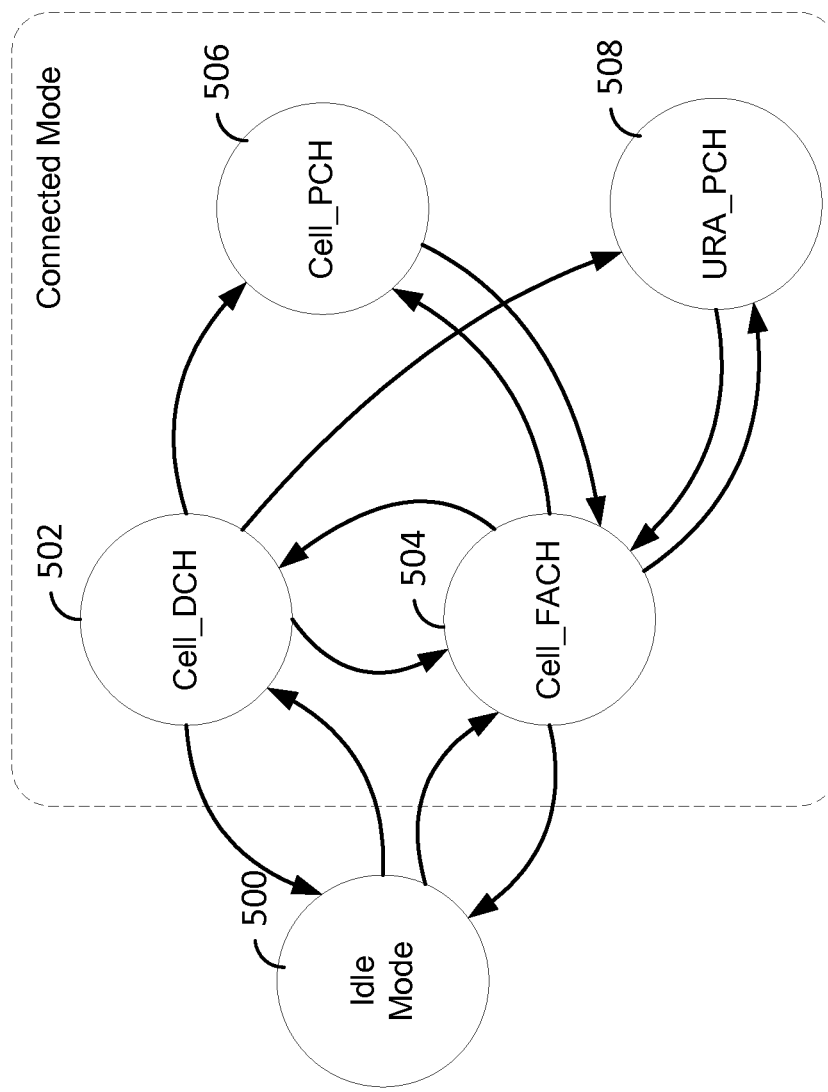
FIG. 5 is a diagram conceptually illustrating the operational modes of a UE operable in the network of FIG. 1 to some embodiments.

FIG. 5 is a state diagram illustrating the operational modes of a UE 110 operable in, for example, the UMTS network 100 as described above. Two basic operational modes of a UE are idle mode and connected mode. The connected mode can be further divided into a number of service states, which define what kind of physical channels the UE 110 is using. FIG. 5 shows the main RRC service states in the connected mode. It also shows the transitions between an idle mode 500 and the connected mode and the possible transitions within the connected mode. In the idle mode 500, the UE 110 is able to receive system information and cell broadcast (CB) messages. The UE 110 stays in the idle mode 500 until it transmits a request to establish an RRC connection. In the idle mode 500, the UTRAN 102 has no information of its own about the individual idle-mode UEs and can only address, for example, all UEs in a cell or all UEs monitoring a paging occasion.

In the connected mode, the UE 110 may be in one of a Cell_DCH state 502, a Cell_FACH state 504, a Cell PCH_ state 506, and a URA_PCH state 508. In the Cell_DCH state 502, a dedicated physical channel is allocated to the UE 110, and the UE 110 is known by its serving RNC on a cell or active set level. In the Cell_FACH state 504, no dedicated physical channel is allocated for the UE 110, but random access channels (RACHs) and forward access channels (FACHs) are used instead, for transmitting both signaling messages and small amounts of user-plane data. The UE's power consumption is typically less in the Cell_FACH state 504 than that of the Cell_DCH state 502.

In the Cell_PCH state 506, the UE 110 is still known on a cell level in the serving RNC (SRNC), but it can be reached only via the paging channel (PCH). In this state, the UE's battery consumption is less than that of the Cell_DCH state 502 and/or the Cell_FACH state 504 since the monitoring of the PCH includes a discontinuous reception (DRX) functionality. If the UE 110 performs a cell reselection, then it moves autonomously to the Cell_FACH state 504 to execute the Cell Update procedure, after which it re-enters the Cell_PCH state 506 if no other activity is triggered during the Cell Update procedure. If a new cell is selected from another radio access system, then the UTRAN state is changed to the idle mode 500 and access to the other system is performed according to that system's specifications.

The URA_PCH state 508 is very similar to the Cell_PCH state 506, except that the UE 110 does not execute Cell Update after each cell reselection, but instead reads UTRAN Registration Area (URA) identities from the BCH, and only if the URA changes (after cell reselection) does the UE 110 inform its location to the SRNC. The power consumption of the UE 110 is typically less in the URA_PCH state 508 than that of the Cell_DCH state 502 and/or the Cell_FACH state 504.

The UE 110 leaves the connected mode and returns to the idle mode 500 when the RRC connection is released or at RRC connection failure. Transitioning the UE 110 among the above states involves exchanging control messages on the control channels. For example, the UE 110 can send a signaling connection release indication (SCRI) to the RNC 106. Based on the values of the received SCRI, the RNC 106 may command the UE 110 to use the Cell_PCH state 506 or the URA_PCH state 508, instead of releasing the RRC connection and dropping the UE 110 into the idle mode 500. In another example, the RNC 106 can command the UE 110 to drop to the idle mode 500 directly from the Cell_DCH state 502.

In the idle mode 500, the UE 110 can transition to the Cell_DCH state 502 or Cell_FACH state 504. This transition from the idle mode 500 is initiated by an RRC connection request. This step involves setting up the necessary radio access bearers (RABs). Transitions from the Cell_FACH state 504 or Cell_DCH state 502 to the Cell_PCH state 506 involves tearing down radio access bearers that have been allocated. A transition from the Cell_DCH state 502 to the Cell_FACH state 504 involves withdrawing the power and code allocated. When the UE 110 is the Cell_DCH state 502, the UE 110 consumes more energy than the other states to keep the connection going in the DCH state.

In many wireless networks (e.g., UMTS), a connection can be transitioned from the Cell_DCH state 502 to the Cell_FACH state 504 to reduce power consumption under certain conditions, but data throughput in the Cell_FACH state 504 is lower than that of the Cell_DCH state 502. However, the amount of energy required on the UE's side can still be significant in the Cell_FACH state 504. Therefore, the UE 110 can be transitioned from the Cell_DCH state 502 and Cell_FACH 504 to an even lower energy consuming state, such as the Cell_PCH state 506, the URA_PCH state 508, or the Idle mode 500.

Figure 6:
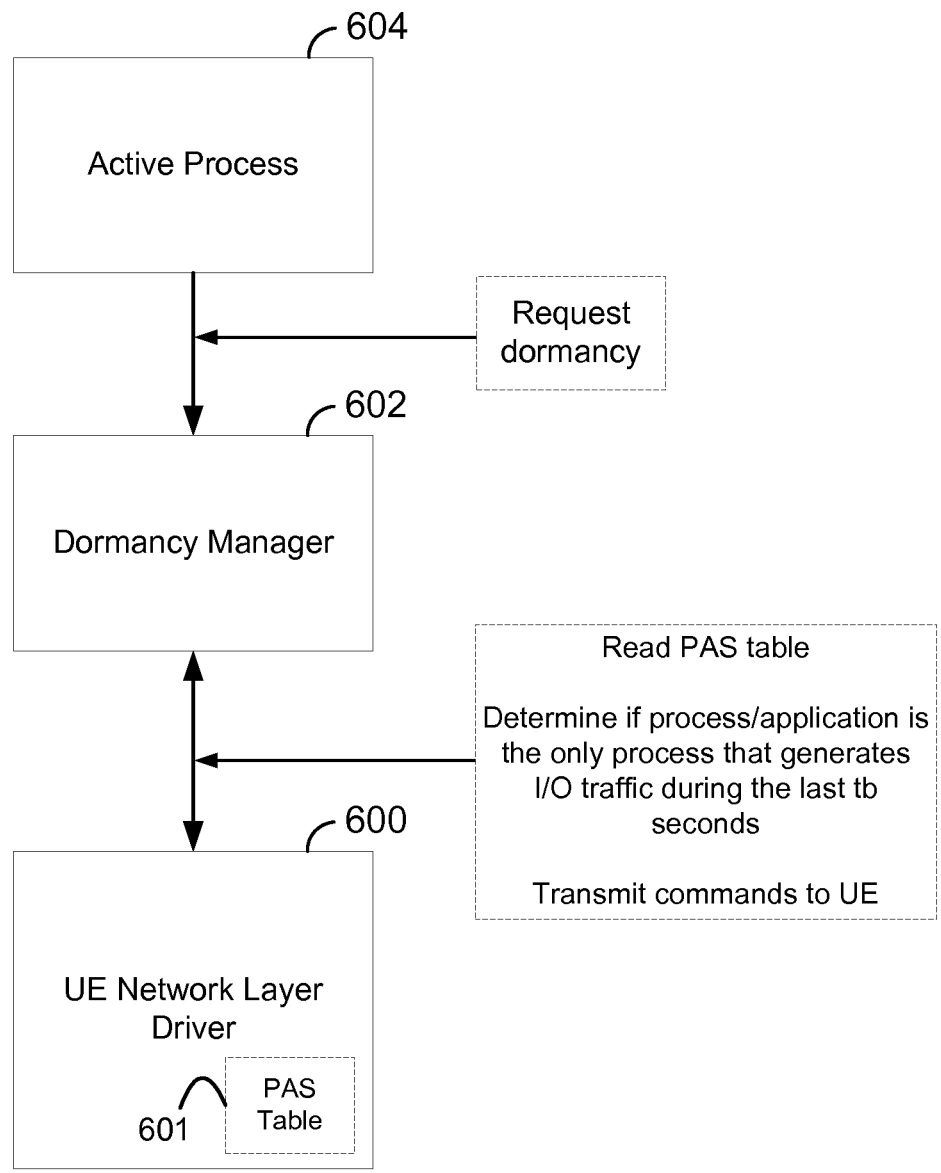
FIG. 6 is a functional block diagram illustrating some elements of a communications network that implements an application driven fast dormancy control scheme according to some embodiments.

FIG. 6 is a block diagram conceptually illustrating some elements of a wireless communications network that implements an application driven fast dormancy control scheme according to an example of this disclosure. The UE 110 is configured to keep track of the transport layer ports that have had any network activity (e.g., TCP or UDP) within a predetermined or configurable time period (e.g., $t_b$ seconds).

In one example, a strategy for adaptively adjusting the time period after starting with a suitable time period ($t_b$) is to keep reducing this time period until it gets to the point where reducing it any further will adversely impact an application using the data connection right after it has been put into a dormant state. For instance, the time period $t_b$ may be decreased by 100 ms after every successful request to go into a dormant state. A successful request may be defined as one that does not cause the system to come out of dormancy just after it enters the state upon the request. To prevent or avoiding hitting this situation too often, it would help to establish a lower bound for $t_b$. The same reasoning may be used in the reverse case, wherein $t_b$ will be increased by 100 ms until unsuccessful requests occur.

In one example, a network layer driver 600 of the UE 110 may be utilized to keep track of all the TCP/UDP ports that have any packet input/input (I/O) within the past $t_b$ seconds. Information about this activity may be dynamically updated, recorded, stored, and/or maintained in a data structure called, for example, a port activity statistics (PAS) table 601.

Figures 7, 8:
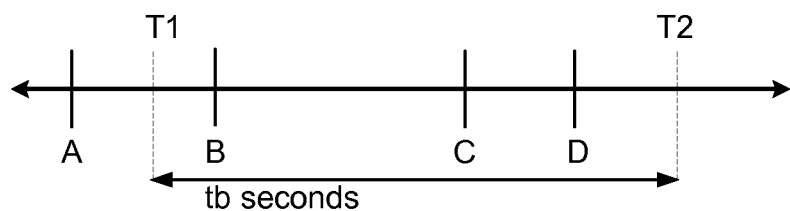
FIG. 7 is a drawing conceptually illustrating a port activity statistics table according to some embodiments.
FIG. 8 is a drawing conceptually illustrating an example of a timeline for a number of network I/O events recorded in a port activity statistics table according to some embodiments.

FIG. 7 is a drawing conceptually illustrating a port activity statistics table according to an example of the present disclosure. The PAS table 601 stores a number of tuples (data entries) in the form of <port number, timestamp>, where "timestamp" is the last time that a data packet was either sent from or received at the corresponding port of the UE 110. In order to make lookups on this table fast, hash-based caching may be used in some examples of the disclosure.

In one example, the network layer driver 600 may be implemented as instructions or code stored in the computer-readable storage medium 206 (FIG. 2) that is executed by the processor 202 (FIG. 2). The PAS table 601 may be stored and dynamically updated in the storage medium 206.

Still referring to FIG. 6, an element is depicted as a dormancy manager (DM) 602 that contains the logic and algorithm of when to trigger dormancy at the UE 110 responsive to a request from an active process 604 that has been in data communication with the UE 110 prior to the request. The active process 604 is configured to communicate to the DM 602 that no future data transfer is anticipated under certain predetermined conditions. For example, the active process 604 may be an email server being accessed by the UE 110. The email server may be configured to download emails to the UE 110 according to a predetermined synchronization schedule or cycle. When the mail server has downloaded all the emails to the UE 110 via the network (e.g., Internet 122, CN 104, UTRAN 102), the mail server notifies the DM 602 that it no longer needs to maintain a data connection with the UE 110. Therefore, the DM 602 may trigger the UE 110 to enter dormancy if no other process has generated any TCP/UDP I/O during the last $t_b$ seconds. However, the present disclosure is not limited thereto, and the active process 604 may be other suitable processes or applications such as an instant messaging server, a social media services server, etc.

FIG. 8 is a drawing conceptually illustrating an example of a timeline for a number of network I/O events recorded in the PAS table 601. Referring to FIG. 8, four network I/O events (A, B, C, and D) occur in sequence at the transport layer of the UE 110. The port numbers and timestamps of these events may be stored in the PAS table 601 at the UE 110. For example, an active process 604 (e.g., an email server) corresponding to the event D determines that it no longer needs to maintain an active data connection with the UE 110. Therefore, the active process 604 sends a dormancy request to the DM 602 that, responsive to the request, obtains the PAS table 601 from the UE 110 and determines whether or not the active process 604 is solely responsible for network traffic (e.g., TCP or UDP traffic) at the transport layer of the UE 110 during the last $t_b$ seconds. If it is determined that the active process 604 is the only process that generates any network I/O at the transport layer of the UE 110 during the last $t_b$ seconds, the DM 602 sends one or more commands (e.g., RRC signaling messages) to the UE 110 that, responsive to the commands, enters dormancy.

In a UMTS network, RRC messages carry all parameters required to set up, modify and release layer 2 and layer 1 protocol entities. RRC messages also carry in their payload all higher layer signaling (mobility management (MM), connection management (CM), session management (SM), etc.). The mobility of user equipment in the connected mode is controlled by RRC signaling (measurements, handovers, cell updates, etc.).

In some examples, the DM 602 may also be able to distinguish between ports related to WiFi interfaces and those related to modem data channel interfaces utilized for transferring data between the UE 110 and the active process 604 via the wireless communications network. The DM 602 may be implemented as hardware, software, or a combination thereof at one or more elements of the UTRAN 102 and the core network 104. For example, the RNC 106 may be configured to include the DM 602.

In one example, the DM 602 receives or obtains a PAS table 601 transmitted from the UE 110 (e.g., the UE network layer driver 600), and analyzes the entries of the table to determine the set of transport ports that the active process 604 generated the I/O on and then subtracts this set from the set of port numbers in the PAS table 601. In some examples, the UE 110 may analyze the PAS table 601 instead of the DM 602, and transfers the results to the DM 602. If the difference operation yields an empty set, the active process 604 requesting dormancy is the only active entity in the system as far as TCP/UDP communication is concerned. When the process/application 604 is the only entity that has performed network I/O over the last $t_b$ seconds, the DM 602 may be configured to trigger the UE 110 to enter dormancy immediately. It is because the result indicates that no other process is or is likely to be using the network. For example, the DM 602 may transmit one or more commands (e.g., RRC signaling messages) to the UE 110 to trigger dormancy.

In the examples of this disclosure, when the UE 110 enters dormancy, it transitions from a first state to a second state that has lower energy consumption than that of the first state. The first state may be the Cell_DCH state 502, Cell_FACH state 504, the Cell_PCH 506, or the URA_PCH state 508. The second state may be the Cell_FACH state 504, the Cell_PCH state 506, the URA_PCH state 508, or the idle mode 500. In one example, the UE 110 may send the PAS table 601 to the DM 602 using the transmitter 210 (FIG. 2), and receives the commands from the DM 602 using the receiver 208. After one or more commands to enter dormancy are received by the UE 110, the processing circuit 202 of the UE 110 (e.g., the PAS circuitry 216 and/or the dormancy circuitry 218) may execute corresponding instructions stored (e.g., dormancy routine 214) in the storage medium 206 to reconfigure one or more of its circuitries in order to enter dormancy.

In one example, the UE network-layer driver 600 maintains port-level last-packet timestamps in the PAS table 601. In some examples, it can do so by reading the correct memory offset (after determining the IP and transport packet types) to determine the port numbers. Just reading the source and destination ports is not computationally intensive and so will only induce negligible overhead. The mechanism used for exposing the PAS table 601 to user space may be OS dependent. For instance, in Linux, this can be done by virtue of the proc file system.

Figure 9:
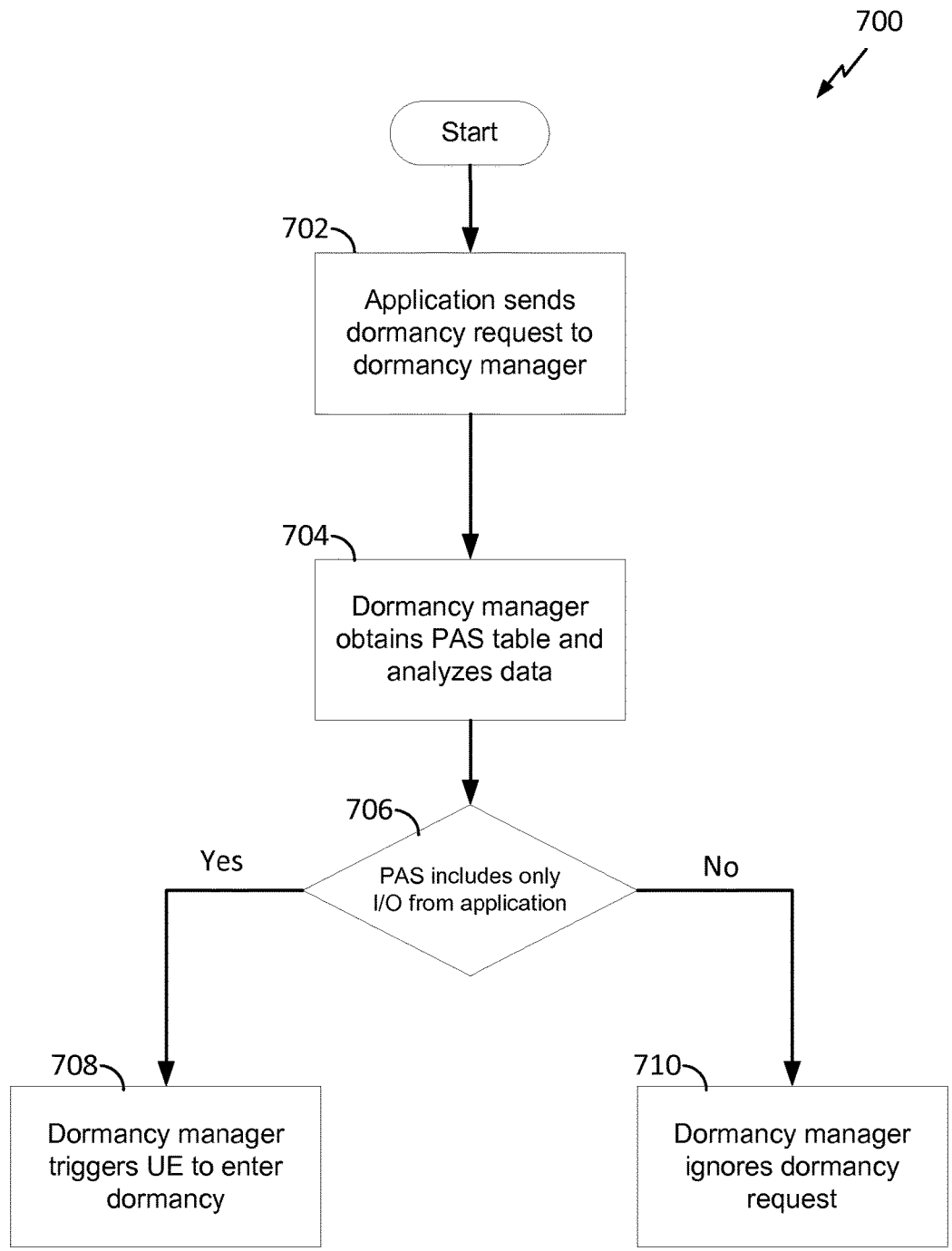
FIG. 9 is a flow chart illustrating a method for operating a wireless communications network that is configured to implement an application driven fast dormancy control scheme according to some embodiments.

FIG. 9 is a flow chart 700 illustrating a method for operating the UE 110 in a wireless communications network that is configured to implement an application driven fast dormancy control scheme according to an example of the disclosure. In 702, the active process 604 running at a suitable application server (e.g., an email server) sends a request to the DM 602 to trigger data dormancy at the UE 110 that is configured to transfer data packets with the application via one or more data channels using the transport layer. Here, the UE 110 may be in the connected mode such as the Cell_DCH state 502 or Cell_FACH state 504. In one example, the active process 604 may be an email server that is downloading emails to the UE 110 according to a synchronization schedule or cycle. When the active process 604 has downloaded all the emails to the UE 110 in a synchronization session, the active process 604 may determine that it has no more emails to exchange with the UE 110 and is unlikely to have further data transfer with the UE 110 in the same session. Accordingly, the active process 604 may send a request to the DM 602 to trigger dormancy at the UE 110.

In 704, responsive to the request from the active process 604, the DM 602 may obtain a PAS table 601 (i.e., network traffic information) from the UE 110. As described above, the PAS table 601 stores a number of tuples in the form of <port number, timestamp>, where "timestamp" is the last time that a packet was either sent from or received at the transport layer of the UE 110. The DM 602 analyzes the data contained in the PAS table 601 to determine (706) whether or not the active process 604 was the only process that generated any network I/O at the transport layer during the last $t_b$ seconds prior to the request. If the result is YES, in 708, the DM 602 transmits one or more commands (e.g., RRC signaling messages) to the UE 110 to trigger it into dormancy. However, if the result is NO, in 710, the DM 602 ignores the request from the active process 604. In other words, the DM 602 will not send any commands to the UE 110 to trigger dormancy. When the UE 110 enters dormancy, it transitions from a first state to a second state having relatively lower energy consumption.

Several aspects of a telecommunications network have been presented with reference to a UMTS network. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims and equivalents thereof, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a controller in wireless communication with a wireless device and an application server, comprising:
   receiving, at a dormancy manager of the controller, a request from an active process running at the application server to trigger the wireless device to enter a dormant state;
   obtaining, in response to the request from the active process, network traffic information from the wireless device, wherein the network traffic information comprises a plurality of data entries, each of the data entries comprises a port number for the wireless device and a timestamp, and the timestamp corresponds to the time a data packet last sent or received by the wireless device at a port identified by the port number; and
   when the network traffic information indicates that the active process is the only process that generates network traffic at the wireless device during a configurable time period, transmitting from the dormancy manager one or more commands to the wireless device such that the wireless device enters the dormant state.

2. The method of claim 1, wherein the network traffic comprises TCP traffic, UDP traffic, or a combination thereof.

3. The method of claim 1, wherein the network traffic information is dynamically updated in accordance with the network traffic during the configurable time period.

4. The method of claim 1, further comprising adjusting the configurable time period based on a previous successful request to enter the dormant state.

5. The method of claim 1, wherein the one or more commands are adapted to trigger the wireless device to transition from a first state to the dormant state, and wherein power consumption of the wireless device at the dormant state is less than that of the first state.

6. The method of claim 5, wherein the first state is one selected from the group consisting of a Cell_DCH state, a Cell_FACH state, a Cell_PCH state, and a URA_PCH state.

7. The method of claim 5, wherein the dormant state is one selected from the group consisting of a Cell_FACH state, a Cell_PCH state, a URA_PCH state, and an idle mode.

8. A method of operating a wireless device in wireless communication with an application server and a controller, comprising:
   communicating with an active process running at the application server and a dormancy manager at the controller, wherein the dormancy manager receives a request from the active process to trigger the wireless device to enter a dormant state;
   storing network traffic information at the wireless device, wherein the network traffic information comprises a plurality of data entries, each of the data entries comprises a port number for the wireless device and a timestamp, and the timestamp corresponds to the time a data packet last sent or received by the wireless device at a port identified by the port number;
   transmitting the network traffic information from the wireless device to the dormancy manager in response to receiving a request from the dormancy manager, wherein the network traffic information indicates that the active process is the only process that generates network traffic at the wireless device during a configurable time period; and
   entering the dormant state in response to receiving one or more commands from the dormancy manager.

9. The method of claim 8, wherein the network traffic information comprises port activity at a transport layer of the wireless device during the configurable time period.

10. The method of claim 8, wherein the network traffic comprises TCP traffic, UDP traffic, or a combination thereof.

11. The method of claim 8, further comprising dynamically updating the network traffic information in accordance with the network traffic at the wireless device during the configurable time period.

12. The method of claim 8, further comprising adjusting the configurable time period based on a previous successful request to enter the dormant state.

13. The method of claim 8, further comprising transitioning from a first state to the dormant state in response to the one or more commands, wherein power consumption of the wireless device at the dormant state is less than that of the first state.

14. The method of claim 13, wherein the first state is one selected from the group consisting of a Cell_DCH state, a Cell_FACH state, a Cell_PCH state, and a URA_PCH state.

15. The method of claim 13, wherein the dormant state is one selected from the group consisting of a Cell_FACH state, a Cell_PCH state, a URA_PCH state, and an idle mode.

16. A controller operable to wirelessly communicate with an application server and a wireless device, comprising:
   means for receiving, at a dormancy manager of the controller, a request from an active process at the application server to trigger the wireless device to enter a dormant state;
   means for obtaining, in response to the request from the active process, network traffic information from the wireless device, wherein the network traffic information comprises a plurality of data entries, each of the data entries comprises a port number for the wireless device and a timestamp, and the timestamp corresponds to the time a data packet last sent or received by the wireless device at a port identified by the port number; and means for when the network traffic information indicates that the active process is the only process that generates network traffic at the wireless device during a configurable time period, transmitting from the dormancy manager one or more commands to the wireless device such that the wireless device enters the dormant state.

17. A wireless device operable to wirelessly communicate with an application server and a controller, comprising:
 means for communicating with an active process running at the application server and a dormancy manager at the controller, wherein the dormancy manager receives a request from the active process to trigger the wireless device to enter a dormant state;
 means for storing network traffic information at the wireless device, wherein the network traffic information comprises a plurality of data entries, each of the data entries comprises a port number for the wireless device and a timestamp, and the timestamp corresponds to the time a data packet last sent or received by the wireless device at a port identified by the port number;
 means for transmitting the network traffic information from the wireless device to the dormancy manager in response to receiving a request from the dormancy manager, wherein the network traffic information indicates that the active process is the only process that generates network traffic at the wireless device during a configurable time period; and
 means for entering the dormant state in response to receiving one or more commands from the dormancy manager.

18. A controller operable to wirelessly communicate with an application server and a wireless device, comprising:
 at least one processor; and
 a memory coupled to the at least one processor, wherein the at least one processor is configured to:
  receive, at a dormancy manager of the controller, a request from an active process running at the application server to trigger the wireless device to enter a dormant state;
  obtain, in response to the request from the active process, network traffic information from the wireless device, wherein the network traffic information comprises a plurality of data entries, each of the data entries comprises a port number for the wireless device and a timestamp, and the timestamp corresponds to the time a data packet last sent or received by the wireless device at a port identified by the port number; and
  when the network traffic information indicates that the active process is the only process that generates network traffic at the wireless device during a configurable time period, transmit from the dormancy manager one or more commands to the wireless device such that the wireless device enters the dormant state.

19. The controller of claim 18, wherein the network traffic comprises TCP traffic, UDP traffic, or a combination thereof.

20. The controller of claim 18, wherein the at least one processor is further configured to dynamically update the network traffic information in accordance with the network traffic during the configurable time period.

21. The controller of claim 18, wherein the at least one processor is further configured to adjust the configurable time period based on a previous successful request to enter the dormant state.

22. The controller of claim 18, wherein the one or more commands are adapted to trigger the wireless device to transition from a first state to the dormant state, and wherein power consumption of the wireless device at the dormant state is less than that of the first state.

23. The controller of claim 22, wherein the first state is one selected from the group consisting of a Cell_DCH state, a Cell_FACH state, a Cell_PCH state, and a URA_PCH state.

24. The controller of claim 22, wherein the dormant state is one selected from the group consisting of a Cell_FACH state, a Cell_PCH state, a URA_PCH state, and an idle mode.

25. A wireless device operable to wirelessly communicate with an application server and a controller, comprising:
 at least one processor; and
 a memory coupled to the at least one processor, wherein the at least one processor is configured to:
  communicate with an active process running at the application server and a dormancy manager at the controller, wherein the dormancy manager receives a request from the active process to trigger the wireless device to enter a dormant state;
  store network traffic information at the wireless device, wherein the network traffic information comprises a plurality of data entries, each of the data entries comprises a port number for the wireless device and a timestamp, and the timestamp corresponds to the time a data packet last sent or received by the wireless device at a port identified by the port number;
  transmit the network traffic information from the wireless device to the dormancy manager in response to receiving a request from the dormancy manager, wherein the network traffic information indicates that the active process is the only process that generates network traffic at the wireless device during a configurable time period; and
  enter the dormant state in response to receiving one or more commands from the dormancy manager.

26. The wireless device of claim 25, wherein the network traffic information comprises port activity at a transport layer of the wireless device during the configurable time period.

27. The wireless device of claim 25, wherein the network traffic comprises TCP traffic, UDP traffic, or a combination thereof.

28. The wireless device of claim 25, wherein the at least one processor is further configured to dynamically update the network traffic information in accordance with the network traffic during the configurable time period.

29. The wireless device of claim 25, wherein the at least one processor is further configured to adjust the configurable time period based on a previous successful request to enter the dormant state.

30. The wireless device of claim 25, wherein the one or more commands are adapted to trigger the wireless device to transition from a first state to the dormant state, and wherein power consumption of the wireless device at the dormant state is less than that of the first state.

31. The wireless device of claim 30, wherein the first state is one selected from the group consisting of a Cell_DCH state, a Cell_FACH state, a Cell_PCH state, and a URA_PCH state.

32. The wireless device of claim 30, wherein the dormant state is one selected from the group consisting of a Cell_FACH state, a Cell_PCH state, a URA_PCH state, and an idle mode.

33. A computer program product, comprising:
a non-transitory computer-readable storage medium comprising code for causing a wireless device in wireless communication with an application server and a controller to:
- communicate with an active process running at the application server and a dormancy manager at the controller, wherein the dormancy manager receives a request from the active process to trigger the wireless device to enter a dormant state;
- store network traffic information at the wireless device, wherein the network traffic information comprises a plurality of data entries, each of the data entries comprises a port number for the wireless device and a timestamp, and the timestamp corresponds to the time a data packet last sent or received by the wireless device at a port identified by the port number;
- transmit the network traffic information from the wireless device to the dormancy manager in response to receiving a request from the dormancy manager, wherein the network traffic information indicates that the active process is the only process that generates network traffic at the wireless device during a configurable time period; and
- enter the dormant state in response to receiving one or more commands from the dormancy manager.

34. A computer program product, comprising:
a non-transitory computer-readable storage medium comprising code for causing a controller in wireless communication with an application server and a wireless device to:
- receive, at a dormancy manager of the controller, a request from an active process running at the application server to trigger the wireless device to enter a dormant state;
- obtain, in response to the request from the active process, network traffic information from the wireless device, wherein the network traffic information comprises a plurality of data entries, each of the data entries comprises a port number for the wireless device and a timestamp, and the timestamp corresponds to the time a data packet last sent or received by the wireless device at a port identified by the port number; and
- when the network traffic information indicates that the active process is the only process that generates network traffic at the wireless device during a configurable time period, transmit from the dormancy manager one or more commands to the wireless device such that the wireless device enters the dormant state.

* * * * *